(12) United States Patent
Franzen

(10) Patent No.: US 9,316,325 B2
(45) Date of Patent: Apr. 19, 2016

(54) AIR PURGING PRESSURE REGULATING VALVE

(71) Applicant: HAMILTON SUNDSTRAND CORPORATION, Charlotte, NC (US)

(72) Inventor: Mark F. Franzen, Brodhead, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 246 days.

(21) Appl. No.: 13/950,611

(22) Filed: Jul. 25, 2013

(65) Prior Publication Data

US 2015/0027568 A1 Jan. 29, 2015

(51) Int. Cl.
G05D 16/10 (2006.01)
F16K 15/02 (2006.01)
F16K 47/00 (2006.01)

(52) U.S. Cl.
CPC .............. *F16K 15/025* (2013.01); *F16K 47/00* (2013.01); *G05D 16/10* (2013.01); *Y10T 137/7922* (2015.04); *Y10T 137/86019* (2015.04)

(58) Field of Classification Search
CPC ................... Y10T 137/2605; Y10T 137/3084; F16K 47/00; G05D 16/10
USPC ........... 251/48, 50, 53; 137/115.26, 497, 507, 137/514–514.7
See application file for complete search history.

(56) References Cited

U.S. PATENT DOCUMENTS

| | | | |
|---|---|---|---|
| 4,161,189 A | 7/1979 | Mueller, Jr. | |
| 4,168,721 A | 9/1979 | Mueller, Jr. | |
| 4,531,709 A * | 7/1985 | Maddalozzo | 251/48 |
| 5,080,082 A | 1/1992 | Mueller et al. | |
| 5,163,706 A | 11/1992 | Maguran, Jr. et al. | |
| 5,848,613 A | 12/1998 | Sakaguchi et al. | |
| 6,289,919 B1 | 9/2001 | Sledd et al. | |
| 6,439,263 B2 | 8/2002 | Schwegler et al. | |
| 7,066,206 B2 * | 6/2006 | Ino et al. | 137/625.65 |
| 7,104,283 B2 * | 9/2006 | Ino et al. | 137/625.65 |
| 7,926,513 B2 * | 4/2011 | Ishibashi et al. | 137/625.68 |
| 8,033,655 B2 | 10/2011 | Nakamura | |
| 8,316,880 B2 | 11/2012 | Grosskopf et al. | |
| 8,439,073 B2 | 5/2013 | Marocchini et al. | |
| 2010/0283333 A1 * | 11/2010 | Lemmers et al. | 310/54 |
| 2010/0283338 A1 * | 11/2010 | Grosskopf et al. | 310/66 |

FOREIGN PATENT DOCUMENTS

GB 2255840 A 11/1992

OTHER PUBLICATIONS

European Search Report for European Application No. 14177120.4 mailed Jan. 27, 2015.

* cited by examiner

*Primary Examiner* — Kevin Murphy
(74) *Attorney, Agent, or Firm* — Carlson, Gaskey & Olds, PC

(57) ABSTRACT

A valve housing receives a spool and the spool has a regulating chamber selectively communicating a supply line to a return line. The spool is biased in one direction by a spring force and there is a second force biasing the spool in an opposed direction with the second bias force being provided by a fluid pressure within a hydraulic system associated with the pressure regulating valve. The amount of communication between the supply port and the return port is regulated by a position of the spool as the bias force from the fluid pressure change. Damper chambers are provided on opposed sides of the spool and serve to dampen a speed of movement of the spool and a supply line for supplying fluid into the damper chambers through check valves. The supply line serves to assist in purging air outwardly of the damper chambers.

19 Claims, 3 Drawing Sheets

US 9,316,325 B2

AIR PURGING PRESSURE REGULATING VALVE

BACKGROUND

This application relates to a pressure regulating valve wherein entrapped air in damping chambers is purged.

Modern aircraft include more and more complex systems. One component typically found on an aircraft is a generator, which is driven by a prime mover and generates electricity. Generator components require lubrication and cooling and, thus, a lubrication pump is typically included within a generator housing and may be driven by the generator.

A generator speed varies with operation of the associated prime mover, and thus the speed of the oil pump will also vary. This can result in the pressure of the oil supplied by the oil pump sometimes being unduly high or low.

The oil pump typically drives the oil through a heat exchanger and then to components to be cooled. To ensure that unduly high or low pressures do not reach downstream locations, a pressure regulating valve is included in the path of the oil.

The pressure regulating valve may be provided with damper chambers which serve to control the speed of movement of the valve and also ensure stable dynamic performance.

The damping action is typically provided by oil in the chambers moving through orifices. However, air can become entrained in this oil, which reduces the damping effect.

SUMMARY

A pressure regulating valve has a valve housing receiving a spool and the spool has a regulating chamber selectively communicating a main supply line to a main return line. The spool is biased in one direction by a spring force and there is a second force biasing the spool in an opposed direction. The second force is provided by a fluid pressure within a hydraulic system associated with the pressure regulating valve. The amount of communication between a main supply port and a main return port is regulated by a position of the spool as the bias force from the fluid pressure changes. This regulates the pressure provided downstream of the pressure regulating valve. Damper chambers are provided on opposed sides of the spool and serve to dampen a speed of movement of the spool. A damper supply line supplies fluid into the damper chambers through check valves. The damper supply line serves to assist in purging air outwardly of the damper chambers.

These and other features may be best understood from the following drawings and specification.

DETAILED DESCRIPTION

Figure 1:
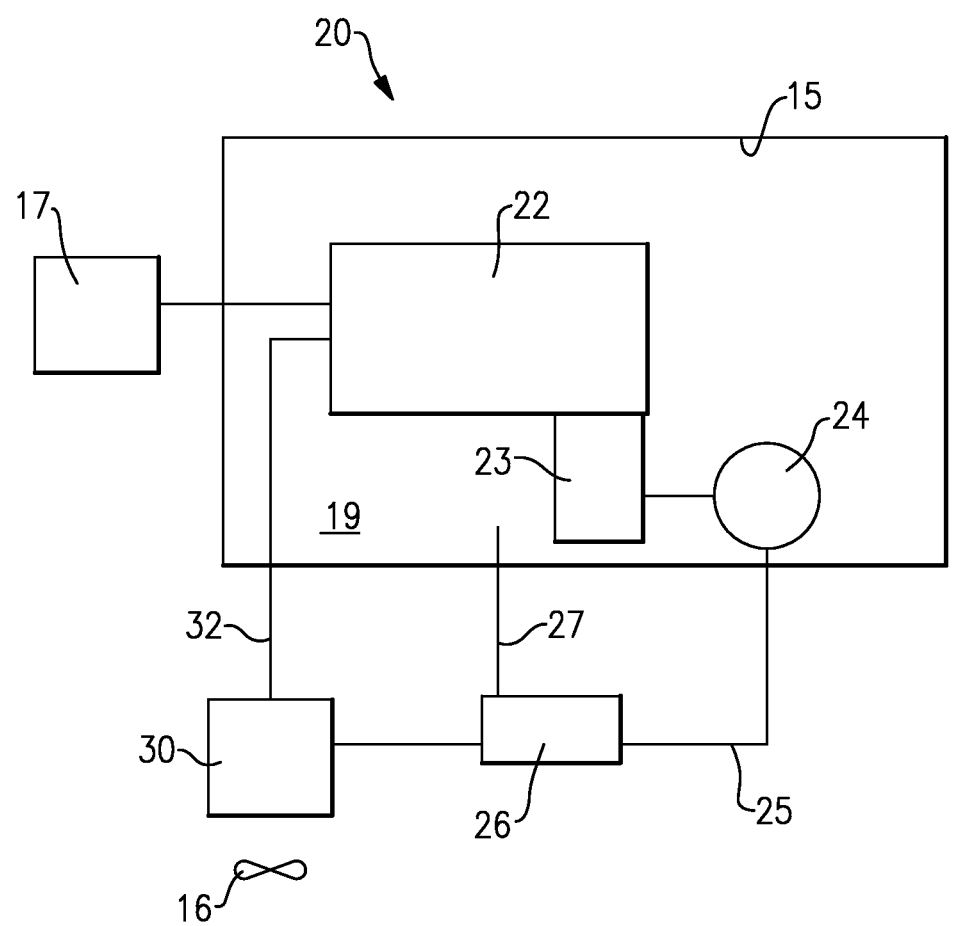
FIG. 1 schematically shows a generator system.

A generator system 20 is illustrated in FIG. 1, and includes a prime mover 17 which drives the generator 22. The prime mover 17 may be an auxiliary power unit or a main gas turbine engine associated with an aircraft. The generator is received within a housing 15. When the generator is driven to rotate, it drives an oil pump 24 through a gear train 23. A discharge line 25 from the oil pump 24 passes through a pressure regulating valve 26, which may dump oil through a line 27 back to a sump 19.

Oil passing downstream of the pressure regulating valve 26 reaches a heat exchanger 30 and a downstream line 32 passes from the heat exchanger 30 to lubricate and cool locations on the generator 22. The heat exchanger 30 may receive a flow of air, such as from air impingement or driven by a fan 16 to cool the oil. It should be understood that the generator system 20 is shown in an extremely schematic form in FIG. 1. Also, it should be understood that pressure regulating valve 26 may actually be inside housing 15.

Figure 2:
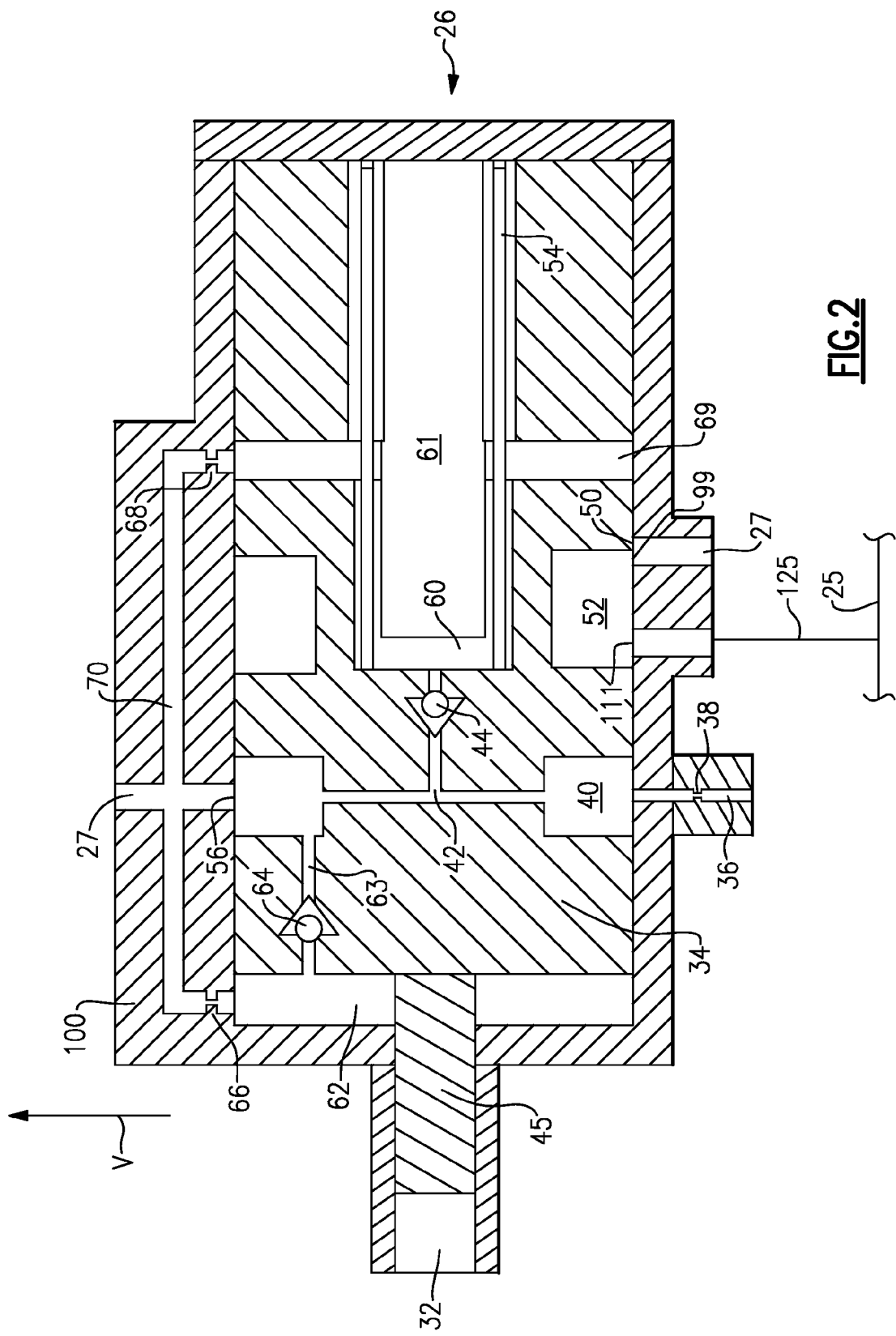
FIG. 2 shows the first embodiment pressure regulating valve.

FIG. 2 illustrates an embodiment of the pressure regulating valve 26 which may be utilized in the FIG. 1 system. A sense piston 45 may see the pressure on the line 32. As this pressure increases, the sense piston 45 is biased to the right against a valve spool 34. Spool 34 includes a valve body and main regulating chamber 52. Regulating main chamber 52 is shown communicating a discharge pressure tap or supply line 125 through a main supply port 111 to a main return line 27 through a main return port 99. As shown, an outer land 50 of the spool 34 is driven to the left or right to block or open the connection between ports 111 and 99.

A spring 54 mounted about a spring support stem 61 drives the spool 34 to the left as shown in this Figure and against the force from the sense piston 45.

The spring 54 thus acts in opposition to a pressure increase on the line 32. As the pressure on line 32 increases, the spool 34 is driven to positions at which it communicates more of the flow from main supply line 125 to the main return line 27.

As the pressure on line 32 decreases, the spring 54 drives the spool 34 to positions wherein less of the connection to main return line 27 is open and more is blocked by the land 50 of the spool 34. In this manner, the pressure reaching the heat exchanger 30 is regulated, and unduly high or low pressures do not reach the heat exchanger 30.

The spool 34 may move at excessively high speeds and, thus, a damper function is provided in the pressure regulating valve 26. The damper function is provided by opposed damper volumes or chambers 60/69 and 62. The chamber 62 resists movement of the spool 34 to the left. The opposed chamber 60 is formed about the spring stem 61 and further includes a chamber 69. The combined chamber 60 and 69 resist movement of the spool 34 to the right.

A connection line 70 connects the chambers 62 and 69 to the return line 27. Damping orifices 66 and 68 resist the flow of the oil from damping chambers 62 and 69 to the connection line 70. This thus serves to limit the speed of movement of the spool 34. As shown, the connection line 70 communicates with the return line 27.

As spool 34 is urged to the left, the volume of the chamber 62 will decrease. Oil in the chamber 62 will be driven through orifice 66, to connection line 70, and to return line 27. The orifice 66 slows the movement of this oil, and in turn slows the speed of movement of the spool 34. If the spool 34 is forced to the right as shown in this Figure, the flow is from the chamber 69, through the orifice 68, to connection line 70, and to return line 27. Again, this will slow the movement of the spool 34.

As shown by the arrow V, the connection line 70 and the orifices 66 and 68 are preferably within the upper vertical half of a housing 100 for the pressure regulating valve 26. More preferably, they are within an upper 45 degrees either side of vertical and, even more preferably, the passages are mounted at a vertically uppermost or top dead center location on the housing 100. In this manner, any air entrained in the oil within the damping chambers 62 and 60/69 will tend to flow into the connection line 70 and be returned to the sump.

Further urging the air out of the damping chamber volumes is a damper supply line 36. The damper supply line 36 may be taken from the discharge line 25 in one embodiment and may be filtered before passing through an orifice 38 and into a damper supply chamber 40 formed within the spool 34. Chamber 40 communicates with a tap 56, which also is returned to the line 27 leading back to the sump 19.

Chamber 40 communicates with a damper supply passage 42 that passes through a check valve 44 into the chamber 60 and then chamber 69. A similar check valve 64 regulates the flow of supply oil through passage 63 into the chamber 62. The check valves 64/44 need not be extremely fluid tight, but rather simply need to serve as a resistance to flow from the oil leaving the chambers 62 and 60/69. The back-flow resistance of the check valve should be at least an order-of-magnitude greater than the flow resistance of the damper orifice 66 and 68.

As air becomes entrained in the damping chambers, the supply of oil through the check valves 64 and 44 will tend to force air upwardly through damper orifice 66 and 68, respectively, into the connection line 70, and then to return line 27.

The orifice 38 has an impedance of at least one order of magnitude higher than a return-to-case impedance through a tap 56 to line 27. This ensures that the pressure in chamber 40 is at least one order of magnitude lower than a supply pressure seen on the main supply line 125, thus not significantly skewing an equilibrium position of spool 34, as balanced between pressure 32 and spring 54.

It should be understood that while the tap 56 is shown communicating with a single line 27, which also receives the return from the main regulating chamber 52, these could be two separate return lines. Moreover, these lines may simply dump back into the sump 59 should the pressure regulating valve 26 be mounted within the housing 15.

As is also shown, the tap line 125 communicates with the discharge line 25, which communicates into the main regulating chamber 52. Thus, the entire flow on the line 25 does not pass through the main regulating chamber 52.

Figure 3:
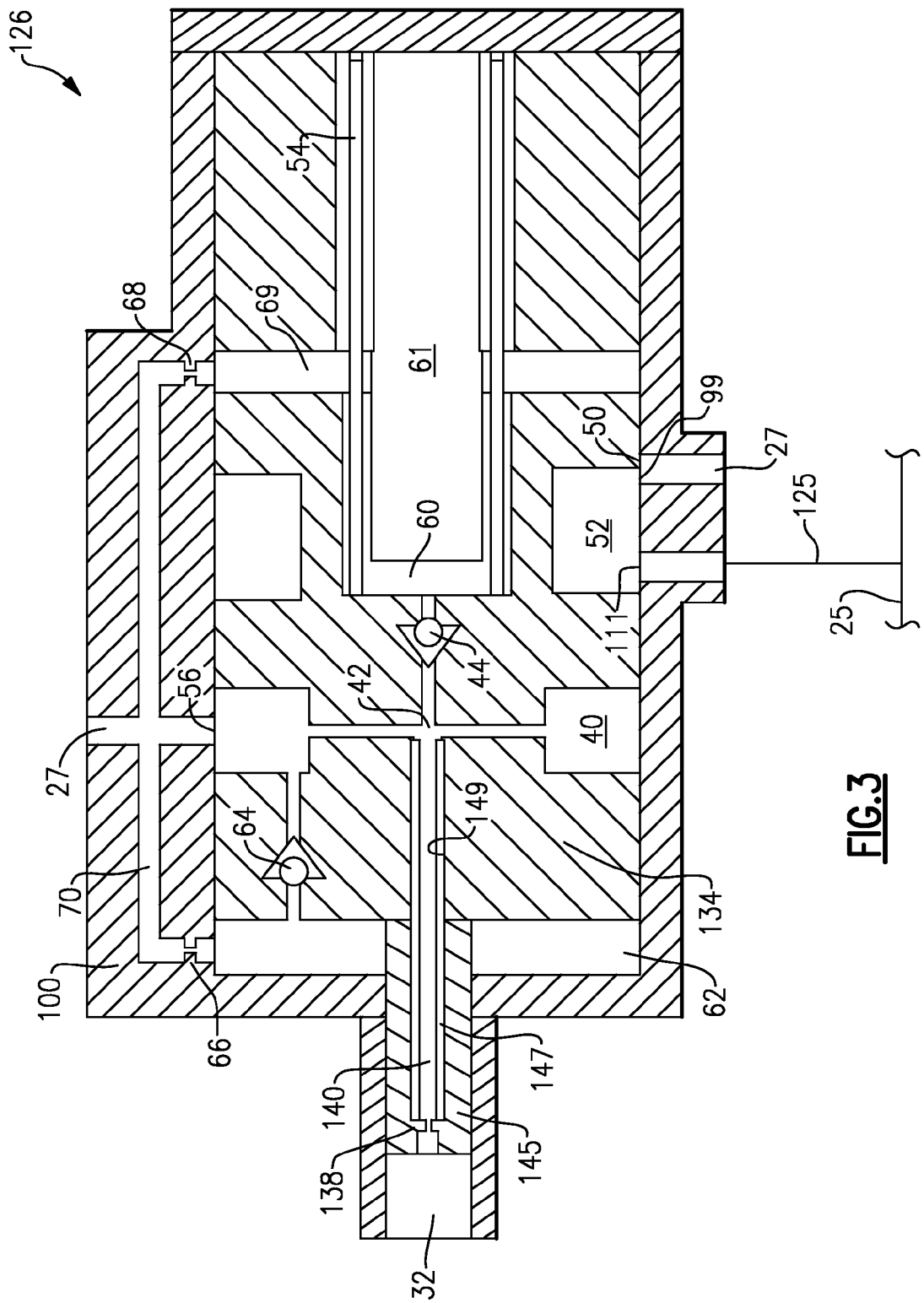
FIG. 3 shows a second embodiment pressure regulating valve.

FIG. 3 shows another embodiment 126. Much of the embodiment 126 is similar to FIG. 2 and, thus, those portions are identified by the same reference numerals. However, the sense piston 145 now includes an internal passage 140 and a transfer tube 147. The transfer tube 147 extends into a bore 149 in the spool 134. The passage 140 through the tube 147 connects into the connection passage 42, which can then supply the oil through the check valves 64 and 44 as in the FIG. 2 embodiment.

An orifice 138 is designed to have the similar impedance factor as the orifice 38.

There may be clearance between an outer periphery of the transfer tube 144 and an inner periphery of the sense piston 145 to accommodate radial misalignment of spool 34 and sense piston 45.

The supply of oil into the damper chambers 62 and 60/69 ensures that the oil found in those chambers will be relatively air free compared to the prior art and will further serve to drive the air upwardly through the damping orifices 66 and 68 and to the return line 27.

While the pressure regulating valves 26 and 126 may be utilized in a generator system, such as shown in FIG. 1, they may also have application in other hydraulic systems requiring a pressure regulating valve function.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A pressure regulating valve comprising:
   a valve housing receiving a spool, said spool having a regulating chamber selectively communicating a main supply port to a main return port, and said spool being biased in one direction by a spring force and there being a second force biasing said spool in an opposed direction, with said second force being provided by a fluid pressure within a hydraulic system associated with said pressure regulating valve, communication between said main supply port and said main return port being regulated by a position of said spool as the second force changes; and
   damper chambers provided on opposed sides of said spool, and serving to dampen a speed of movement of said spool, and a damper supply line in said spool for supplying fluid into said damper chambers through check valves in said spool, said damper supply line serving to assist in purging air outwardly of said damper chambers.

2. The pressure regulating valve as set forth in claim 1, wherein said damper chambers communicate to a damper return passage through damping orifices to allow removal of air from said damper chambers.

3. The pressure regulating valve as set forth in claim 2, wherein said damper return passage is downstream of the damping orifice associated with each of said damper chambers, and said damping orifice provides a damper function by regulating a flow of the fluid between each said damper chamber and said damper return passage as the spool moves under the influence of the second force and the spring force.

4. A pressure regulating valve comprising:
   a valve housing receiving a spool, said spool having a regulating chamber selectively communicating a main supply port to a main return port, and said spool being biased in one direction by a spring force and there being a second force biasing said spool in an opposed direction, with said second force being provided by a fluid pressure within a hydraulic system associated with said pressure regulating valve, communication between said main supply port and said main return port being regulated by a position of said spool as the second force changes;
   damper chambers provided on opposed sides of said spool, and serving to dampen a speed of movement of said spool, and a damper supply line for supplying fluid into said damper chambers through check valves, said damper supply line serving to assist in purging air outwardly of said damper chambers;
   wherein said damper chambers communicate to a damper return passage through damping orifices to allow removal of air from said damper chambers;
   wherein said damper return passage is downstream of the damping orifice associated with each of said damper chambers, and said damping orifice provides a damper function by regulating a flow of the fluid between each said damper chamber and said damper return passage as the spool moves under the influence of the second force and the spring force;
   wherein said damping orifices are provided in a vertically upper location of the housing, with said damping orifices within an upper forty-five degrees on either side of a plane that will be vertical when said pressure regulating valve is mounted in use; and wherein said damping orifices are provided at top dead center of said housing.

5. The pressure regulating valve as set forth in claim 1, wherein said damper supply line passes through a feed orifice to lower a pressure of the fluid being supplied through the check valves.

6. The pressure regulating valve as set forth in claim 1, wherein said damper supply line receives a discharge pressure from a pump associated with a system including said pressure regulating valve.

7. The pressure regulating valve as set forth in claim 1, wherein said damper supply line passes into a chamber defined in an outer periphery of said spool.

8. The pressure regulating valve as set forth in claim 1, wherein a sense piston is biased by the second force against said spool.

9. The pressure regulating valve as set forth in claim 8, wherein said sense piston includes a central bore and said central bore communicates the damper supply fluid into a chamber within said spool.

10. A generator oil supply system comprising:
a generator housing receiving a pump driven by a generator, a pressure regulating valve positioned downstream of said pump and a heat exchanger positioned downstream of said pressure regulating valve;
the pressure regulating valve including a valve housing receiving a spool, said spool having a regulating chamber selectively communicating a main supply port to a main return port, and the main supply line receiving fluid from a pump discharge line, and said spool being biased in one direction by a spring force and there being a second force biasing said spool in an opposed direction, with said second force being provided by a fluid pressure indicative of a pressure within the oil supply system, communication between said main supply port and said main return port being regulated by a position of said spool as the second force changes;
damper chambers provided on opposed sides of said spool, and serving to dampen a speed of movement of said spool, and a damper supply line in said spool for supplying fluid into said damper chambers through check valves in said spool, said damper supply line serving to assist in purging air outwardly of said damper chambers; and
a sump in included as a reservoir for the fluid, and said main return port returning fluid to said sump.

11. The generator oil supply system as set forth in claim 10, wherein said damper chambers communicate to a damper return passage through damping orifices to allow removal of air from said damper chambers.

12. The generator oil supply system as set forth in claim 11, wherein said damper return passage is downstream of one of the damping orifices associated with each of said damper chambers, and said damping orifices providing a damper function by regulating a flow of the fluid between each said damper chamber and return passage as the spool moves under the influence of the second force and the spring force.

13. The generator oil supply system as set forth in claim 12, wherein said damping orifices are provided in a vertically upper location of the housing.

14. The generator oil supply system as set forth in claim 13, wherein said damping orifices are provided at top dead center of said housing.

15. The generator oil supply system as set forth in claim 10, wherein said damper supply line passes through a feed orifice to lower a pressure of the fluid being supplied through the check valves.

16. The generator oil supply system as set forth in claim 10, wherein said damper supply line receives a discharge pressure from a pump associated with a system including said pressure regulating valve.

17. The generator oil supply system as set forth in claim 10, wherein said damper supply line passes into a chamber defined in an outer periphery of said spool.

18. The generator oil supply system as set forth in claim 10, wherein a sense piston is biased by said second force against said spool.

19. The generator oil supply system as set forth in claim 18, wherein said sense piston includes a central bore and said central bore communicates the damper supply fluid into a chamber within said spool.

\* \* \* \* \*